(12) United States Patent
Lashbrook et al.

(10) Patent No.: US 11,279,245 B2
(45) Date of Patent: Mar. 22, 2022

(54) POWERING OF DRONE CARRYING TRANSCEIVER

(71) Applicant: T-Mobile USA, Inc., Bellevue, WA (US)

(72) Inventors: Kyle Lashbrook, Seattle, WA (US); Steve Fischer, Fort Collins, CO (US)

(73) Assignee: T-MOBILE USA, INC., Bellevue, WA (US)

( * ) Notice: Subject to any disclaimer, the term of this patent is extended or adjusted under 35 U.S.C. 154(b) by 333 days.

(21) Appl. No.: 16/457,263

(22) Filed: Jun. 28, 2019

(65) Prior Publication Data

US 2020/0307399 A1 Oct. 1, 2020

Related U.S. Application Data

(63) Continuation-in-part of application No. 16/370,144, filed on Mar. 29, 2019, now abandoned.

(51) Int. Cl.
| | |
|---|---|
| *B60L 53/18* | (2019.01) |
| *H02J 7/00* | (2006.01) |
| *B64F 1/36* | (2017.01) |
| *B64C 39/02* | (2006.01) |
| *B60L 53/30* | (2019.01) |
| *B60L 55/00* | (2019.01) |
| *B60L 58/21* | (2019.01) |

(52) U.S. Cl.
CPC ............. *B60L 53/18* (2019.02); *B60L 53/305* (2019.02); *B60L 55/00* (2019.02); *B60L 58/21* (2019.02); *B64C 39/022* (2013.01); *B64C 39/024* (2013.01); *B64F 1/362* (2013.01); *H02J 7/0014* (2013.01); *H02J 7/0063* (2013.01); *B60L 2200/10* (2013.01); *B64C 2201/042* (2013.01)

(58) Field of Classification Search
CPC .......... B60L 53/18; B60L 55/00; B60L 58/21; B60L 53/305; B60L 2200/10; B60L 53/30; B64C 39/022; B64C 39/024; B64C 2201/042; B64C 39/02; B64F 1/362; B64F 1/36; H02J 7/0014; H02J 7/0063; H02J 7/00
See application file for complete search history.

(56) References Cited

U.S. PATENT DOCUMENTS

2020/0361632 A1* 11/2020 Ghosh ................... B64D 27/24

* cited by examiner

*Primary Examiner* — Robert L Deberadinis
(74) *Attorney, Agent, or Firm* — Brownstein Hyatt Farber Schreck, LLP

(57) ABSTRACT

A drone is described. The drone includes a propulsion system, a transceiver, a tether connector, and a power system. The power system has a battery and a chopper circuit. The chopper circuit bleeds excess charge from the battery. The power system is configured to power the propulsion system, and to power the transceiver through the chopper circuit. The power system is also configured to receive electrical power, through the tether connector, to charge the battery while the drone is in the air.

20 Claims, 8 Drawing Sheets

POWERING OF DRONE CARRYING TRANSCEIVER

CROSS-REFERENCE TO RELATED APPLICATION

This application is a continuation-in-part of U.S. patent application Ser. No. 16/370,144, filed Mar. 29, 2019 and titled "Powering of Drone Carrying Base Station Transceiver," the disclosure of which is hereby incorporated herein by reference in its entirety.

FIELD

Embodiments described herein relate to powering a drone that carries a transceiver (e.g., a base station transceiver) and, in some cases, to powering a tethered drone (or tethered unmanned aerial vehicle) that carries a transceiver. The transceiver may be operable to provide wireless communication links (e.g., cellular or Wi-Fi radio communication links) with electronic communication devices (e.g., user equipment (UEs)). A tether connected to the drone may be operable to supply electrical power to the drone, and may also be operable to transmit communications between the drone and ground-based communication equipment. Embodiments disclosed herein generally relate to the powering of disparate systems on-board a tethered drone, and to balancing charge on a drone battery having multiple parallel-connected battery cells. Embodiments disclosed herein also relate to the powering of a drone via tether power and/or battery power.

BACKGROUND

Electronic communication devices are commonplace in today's society. Example electronic communication devices (or UEs) include mobile phones, tablet computers, laptop computers, electronic watches, and other types of devices that are capable of communicating with each other, with web servers, or with equipment connected to various types of networks. Communications with a UE may be carried over a variety of wired or wireless networks, including circuit-switched networks (typically voice networks) and packet-switched networks (typically data networks). In some cases, a radio access network may connect a UE to a core network managed by a particular mobile carrier (e.g., a cellular service provider), or to various circuit-switched and/or packet-switched networks operated by the mobile carrier, other mobile carriers, or other service providers.

A radio access network may include, for example, a number of base station transceivers. A base station transceiver may establish and maintain wired or satellite communication links with core, circuit-switched, or packet-switched networks, and may establish wireless communication links with multiple UEs. A set of one or more base station transceivers (e.g., three base station transceivers) mounted on a tower and positioned to provide radio access for UEs within an angular extent about the tower (and in some cases, within an angular extent of 360° about the tower) may define a cell of a radio access network. When a cell is defined by multiple base station transceivers, each base station transceiver within the cell may define a sector of the cell. Alternatively, each sector may be considered a cell. As a UE moves from one cell to another cell, the UE's network connection(s) may be transferred (e.g., handed off) from a base station transceiver in one cell to a base station transceiver in another cell.

When a base station transceiver becomes inoperable for an extended period of time, such as when a natural disaster compromises the base station transceiver (or the tower on which it is mounted, or the equipment cabinet that connects the base station transceiver to a backhaul network, or the power or backhaul network that provides service to the equipment cabinet), the UEs of users entering the cell served by the inoperable base station transceiver may be unable to connect to other UEs or networks, and the users may perceive a network outage. To temporarily restore network access, an operator of a radio access network may deploy mobile communication equipment that provides temporary service for the cell (e.g., service for a number of days or weeks). Such mobile communication equipment may include, for example, an electrical power generator, a base station transceiver, and a temporary tower on which the base station transceiver is mounted. The mobile telecommunication equipment may also include other types of equipment. The base station transceiver may connect to a ground-based satellite dish, or to a cable or fiber optic communication system, that connects that base station transceiver to a backhaul network.

SUMMARY

This summary is provided to introduce a selection of concepts, in simplified form, that are further described in other sections. This summary is not intended to identify key features or essential features of the claimed subject matter, nor is it intended to be used as an aid in determining the scope of the claimed subject matter.

The devices, methods, and systems described herein include drones or other unmanned aerial vehicles (UAVs), on-board power systems for a drone and/or a transceiver (e.g., a base station transceiver) carried by a drone, and tethers or cables that may connect a power system or transceiver carried by a drone to a ground-based power delivery system and/or communication system. Also described are methods of powering and operating a drone, such as a drone that carries a transceiver (e.g., a base station transceiver).

The drones described herein may be configured to connect UEs to various communication networks, including radio access networks. For example, a drone may fly or hover at an altitude that enables UEs to communicate with a base station transceiver carried by the drone, and a tether connected to the drone may connect power and communication systems of the drone to ground-based power delivery and communication systems. Alternatively, a drone carrying a transceiver may take off while connected to ground-based power delivery and communication systems via a tether, and then detach from the tether before executing a mission (e.g., a mission to locate a beacon of, or establish communication with, a UE of a person who is lost in the mountains).

More specifically, a drone is described herein. The drone may include a propulsion system, a base station transceiver, a tether connector, and a power system. The power system may have a battery and a chopper circuit. The chopper circuit may bleed excess charge from the battery. The power system may be configured to power the propulsion system, and to power the base station transceiver through the chopper circuit. The power system may also be configured to receive power, through a tether connected to the tether connector, to charge the battery while the drone is in the air.

Also described is a communication system. The communication system may include a base station transceiver, a battery having multiple parallel-connected battery cells, and a charge-balancing circuit coupled to each of the multiple parallel-connected battery cells. The battery may be configured to provide a first power output in a first voltage domain. The charge-balancing circuit may be configured to provide a second power output in a second voltage domain. The base station transceiver may be configured to receive electrical power from the second voltage domain.

A method of powering a drone carrying a base station transceiver is also described. The method may include receiving electrical power over an air-to-ground power feed; charging, using the received electrical power, a set of multiple parallel-connected battery cells; balancing a first charge across the set of multiple parallel-connected battery cells; bleeding, from the multiple parallel-connected battery cells and through a chopper circuit, a second charge; powering a propulsion system of the drone in a first voltage domain using at least one of the received electrical power or the first charge; and powering a base station transceiver of the drone in a second voltage domain using the second charge.

BRIEF DESCRIPTION OF THE DRAWINGS

The disclosure will be readily understood by the following detailed description in conjunction with the accompanying drawings, wherein like reference numerals designate like structural elements.

Figure 1:
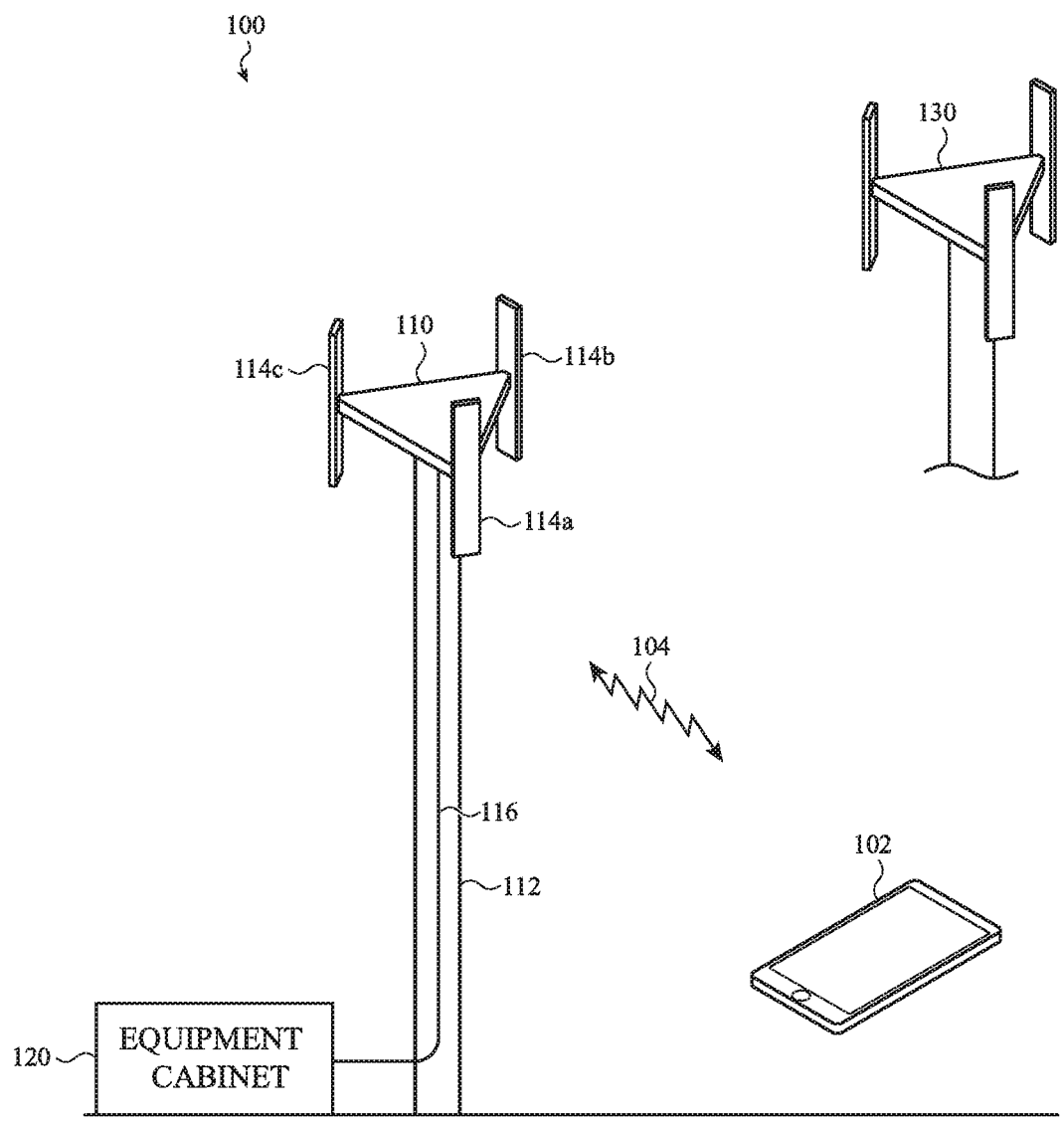
FIG. 1 illustrates a selection of components in an exemplary communication network.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

Some of the embodiments described herein are directed to devices, methods, and systems that may be used as part of a communication network (e.g., a radio access network). The communication network may operate to provide communication services to UEs. Examples of such services include voice, data, video, radio, television, and other communications sent electronically, either through physical or wired connections, or wirelessly using electromagnetic radiation (e.g., radio frequency (RF) electromagnetic radiation). Examples of UEs include mobile phones, tablet computers, laptop computers, electronic watches, and other types of devices that are capable of communicating with each other, with web servers, or with equipment connected to various types of networks.

Some of the embodiments described herein are directed to devices, methods, and systems that may be used to power drones, and equipment that is on-board a drone.

Some of the embodiments described herein pertain to mobile communication equipment that can restore network access (e.g., UE access to a radio access network) when a base station transceiver of the radio access network is temporarily unavailable, as may be the case when a natural disaster (e.g., a hurricane, tornado, tsunami, flood, or fire) knocks out the base station transceiver, the tower on which it is mounted, the equipment cabinet that connects the base station transceiver to a backhaul or power source, and so on.

Some of the embodiments described herein pertain to mobile communication equipment that can search for a beacon emitted by a UE, or establish communication with the UE, when the UE is believed to be with a user who is lost in the mountains or elsewhere where cellular radio coverage does not exist.

In some embodiments, a set of series-connected chopper circuits may bleed excess charge from a drone's battery and power a base station transceiver, avionics system, or other components on-board the drone. The voltage domain provided by the set of series-connected chopper circuits may differ from a voltage domain of the battery (e.g., the voltage domains may provide different voltage outputs or other electrical parameters). The set of series-connected chopper circuits can improve drone efficiency by using excess charge, that might be otherwise dissipated as heat, to power systems and components that need to be operated in a different voltage domain.

In some embodiments, the chopper circuits in a set of series-connected chopper circuits may be used to balance a charge on multiple parallel-connected battery cells of a drone battery. Such a balancing can improve the performance and longevity of the battery as a whole, and provide a more uniform power output to systems and components that are powered by the battery.

These and other embodiments are discussed below with reference to FIGS. 1-8. However, those skilled in the art will readily appreciate that the detailed description given herein with respect to these figures is for explanatory purposes only and should not be construed as limiting.

FIG. 1 illustrates a selection of components in an exemplary communication network 100. By way of example, the communication network 100 is shown to be a cellular communication network, but the devices, methods, and systems described herein can be used in other types of communication networks.

The communication equipment included in the communication network 100 may include base stations 110, 130 and UEs 102. The base stations 110, 130 and UEs 102 may communicate via wireless communication links 104, and the base stations 110, 130 may transmit communications between the UEs 102 and one or more communication networks (e.g., a core network of a mobile carrier, a circuit-switched network (e.g., a voice network, which in some cases may carry data, such as text messages) or a packet-switched network (e.g., a data network, which in some cases may carry voice communications, such as voice-over-IP (VoIP) communications). For purposes of this description, a base station is intended to include a base transceiver station (BTS), a Node B, an evolved Node B (eNB), or any other type of equipment installed at the edge of a radio access network for the purpose of communicating with UEs 102.

An example UE 102 is illustrated as a mobile phone, but may alternatively be any other type of electronic communication device that is capable of communicating over a wireless communication link, such as a tablet computer, laptop computer, electronic watch, and so on. While only one UE 102 is shown in FIG. 1, one or many UEs 102 (or no UEs 102) may communicate with each of the base stations 110, 130 shown in FIG. 1.

The wireless communication link 104 may be established using any one or more of a number of radio access technologies (RATs), including, for example, Bluetooth, Wi-Fi, Global System for Mobile communications (GSM), Universal Mobile Telecommunications System (UMTS), Long-Term Evolution (LTE), or 5G new radio (5G NR) RATs.

The wireless communication link 104 may allow one or both of reception and transmission of communication by the UE 102. For example, a mobile phone may both transmit and receive, whereas a remote sensor (e.g., a weather beacon or tracking device) may in some cases only transmit, and a broadcast device (e.g., a billboard) may in some cases only receive.

By way of example, two base stations 110, 130 of the communication network 100 are shown. Each base station 110, 130 may include a tower 112 that supports one or more antennas 114a, 114b, 114c and associated base station transceivers (e.g., radios that transmit and receive using the antennas 114a, 114b, 114c). The base station transceivers may be connected to equipment stored within an equipment cabinet 120 at the base of a tower 112. The equipment stored within the equipment cabinet 120 may include baseband switching equipment, signal filtering and conditioning equipment (e.g., power amplifiers, modulators, digital signal processing equipment, analog-to-digital converters, and so on), an electrical power supply (e.g., a battery) or power grid connection, and so on. An electrical power generator may also be located in or near the equipment cabinet 120. The base station transceivers may be connected to the equipment within the equipment cabinet 120 by one or more power feeds (e.g., a set of redundant power feeds) and one or more communication channels (e.g., one or more copper, fiber, or fiber optic lines or cables) contained within one or more cables 116. In some embodiments, the cable(s) 116 may include one or more hybrid cables, which each contains both power feeds and communication channels.

In the example shown, the UE 102 may establish the wireless communication link 104 with an antenna 114 that provides the best signal strength for the UE 102 or base station 110, or may establish multiple wireless communication links with the UE 102, using one or more antennas 114 on one or both of the base stations 110, 130. Alternatively, the communication network 100 may determine which base station 110, 130 is allowed to communicate with the UE 102. The antenna 114 (and associated base station transceiver) that the UE 102 communicates with may also be determined by other means, or based on other parameters.

As previously mentioned, the equipment cabinet 120 may include various components for supporting the components (e.g., base station transceivers and antennas 114) installed on top of, or otherwise mounted on, the tower 112. The components within the equipment cabinet 120 may also transmit communications between the base station transceivers and antennas 114 on the tower 112 and a backhaul network. A connection to the backhaul network may include copper (coax), fiber, fiber optic cables, or a satellite connection. The connection to the backhaul enables the UE 102 to communicate with other UEs, web servers, or other equipment connected to various types of networks.

Figure 2:
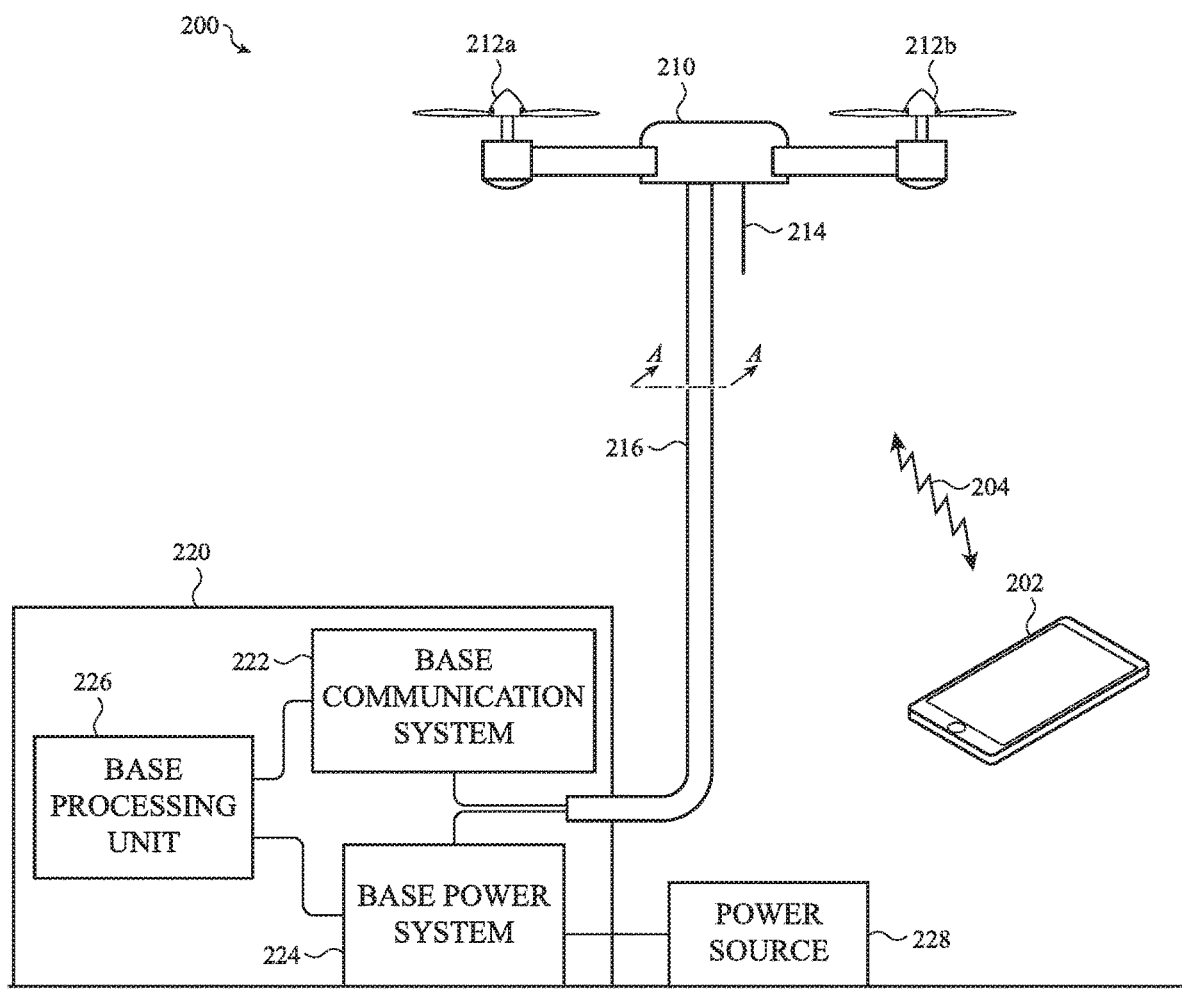
FIG. 2 illustrates exemplary mobile communication equipment that may be used to temporarily replace one of the base stations described with reference to FIG. 1.

FIG. 2 illustrates exemplary mobile communication equipment 200 that may be used to temporarily replace one of the base stations described with reference to FIG. 1. For example, in the event that a base station becomes inoperable due to a natural disaster, the mobile communication equipment 200 may be deployed at or near a location of the inoperable base station (or elsewhere), and be operated as a substitute for the inoperable base station, so that UEs do not perceive a network outage. Alternatively, the mobile communication equipment 200 may be used in addition to the base stations described with reference to FIG. 1.

The mobile communication equipment 200 may include a drone 210 that is configured to fly or hover over or near ground-based mobile base station equipment (MBSE) 220. The drone 210 may be connected to the MBSE 220 by a tether 216 (e.g., a cable). The tether 216 may limit how high or far the drone 210 can move away from the MBSE 220. However, the primary purpose of the tether 216 is to supply the drone 210 with electrical power provided (and in some cases generated) by the MBSE 220. The tether 216 may include one or more power feeds therein for supplying such electrical power. In some cases, the tether 216 may include a set of redundant power feeds (e.g., six power feeds). The power feed(s) within the tether 216 may be connected between a power system of the drone 210 and a base power system 224 of the MBSE 220. The power feed(s) within the tether 216 may in some cases be referred to herein as air-to-ground power feeds.

The tether 216 may also include one or more data lines, signal lines, or other communication channels, which may carry different signals or data to improve the throughput of signal/data transfers through the tether 216, or carry the same or different versions of the same signals/data to improve the robustness (e.g., low error rate) of signal/data transfers through the tether 216. As described herein in relation to the tether 216, "data" may include signals or messages transmitted in circuit-switched or packet-switched networks, as well as various control signals transmitted outside of a network. The signal or data line(s) within the tether 216 may in some cases be connected between an avionics system or communication system (e.g., a base station transceiver) on-board the drone 210 and a base communication system 222 of the MBSE 220.

The drone 210 may include an on-board communication system (e.g., a base station transceiver, which may also be referred to as a mobile base station transceiver (or just a transceiver)). The communication system on-board the drone 210 may establish a wireless communication link 204 with a UE 202 (or establish wireless communication links with multiple UEs 202) and connect the UE 202 (or UEs) to a backhaul network via the base communication system 222 of the MBSE 220.

The drone 210 may include an antenna 214, such as a whip antenna, which may be used to establish the wireless communication link 204 and transmit/receive communications (e.g., signals or data) to/from the UE 202. In alternative embodiments, the drone 210 may have a greater number of antennas, or different types of antennas. The antenna 214 may be connected to the base station transceiver on-board the drone 210.

The drone 210 may be a pilotless aircraft (e.g., a UAV). The drone 210 may operate semi-autonomously, using computer-implemented instructions stored in the drone's avionics system. Additionally and/or alternatively, the drone 210 may receive instructions from an operator over a communication link. Such a communication link between the drone 210 and an operator may be established over a communication channel within the tether 216, or over a wireless communication link.

The drone 210 may fly or hover using a set of propellers, including propellers 212a and 212b. While only two propellers are shown in FIG. 2's elevation of the drone 210, the drone 210 may have four, six, eight, or any number of propellers. Alternatively, a drone may have a single central propeller. The propellers 212a, 212b may be powered by electrical power received over one or more power feeds included in the tether 216, or by a battery on-board the drone 210.

The MBSE 220 may be transportable by a vehicle (not shown) to a location where the drone 210 is launched. The MBSE 220 may receive power from a power source 228, such as an electrical power generator or electrical power grid. The power source 228 may be a mobile power source included as part of the MBSE 220, or a separate component or structure.

The MBSE 220 may include a base power system 224 that receives power, such as electrical power, provided by the power source 228. The base power system 224 may provide AC-to-DC conversion, DC-to-DC conversion, electrical power filtering and conditioning, and/or other functions to provide appropriate electrical powering of other components of the MBSE 220. The base power system 224 may also provide electrical power to the drone 210, through the tether 216.

The MBSE 220 may further include a base processing unit 226 (e.g., a discrete or distributed processor, a microprocessor, a microcontroller, a central processing unit (CPU), a peripheral interface controller (PIC), an application-specific integrated circuit (ASIC), a field programmable gate array (FPGA), or another form of processing unit), which may control and coordinate the operations and functions of the MBSE 220. In some cases, the base processing unit 226 may include control and/or computational components and/or circuits, such as automated control units, or analog or digital signal processing components. Together, the power source 228 and the MBSE 220 may be referred to herein as a power delivery system.

The MBSE 220 may also contain a base communication system 222, which may connect with a backhaul network. The base communication system 222 may transmit communications received from the backhaul network to the drone 210, over communication channels within the tether 216. The drone 210 may then transmit corresponding communications to the UE 202, over the wireless communication link 204. Additionally, the base communication system 222 may receive communications from the drone 210, over communication channels within the tether 216, and transmit corresponding communications over the backhaul network. In this manner, the base communication system 222 may provide the UE 202 with transmit and receive channels over the backhaul network. UEs 202 may communicate over the backhaul network, through the drone 210 and MBSE 220, while the drone 210 is connected to the MBSE 220 via the tether 216.

Figure 3:
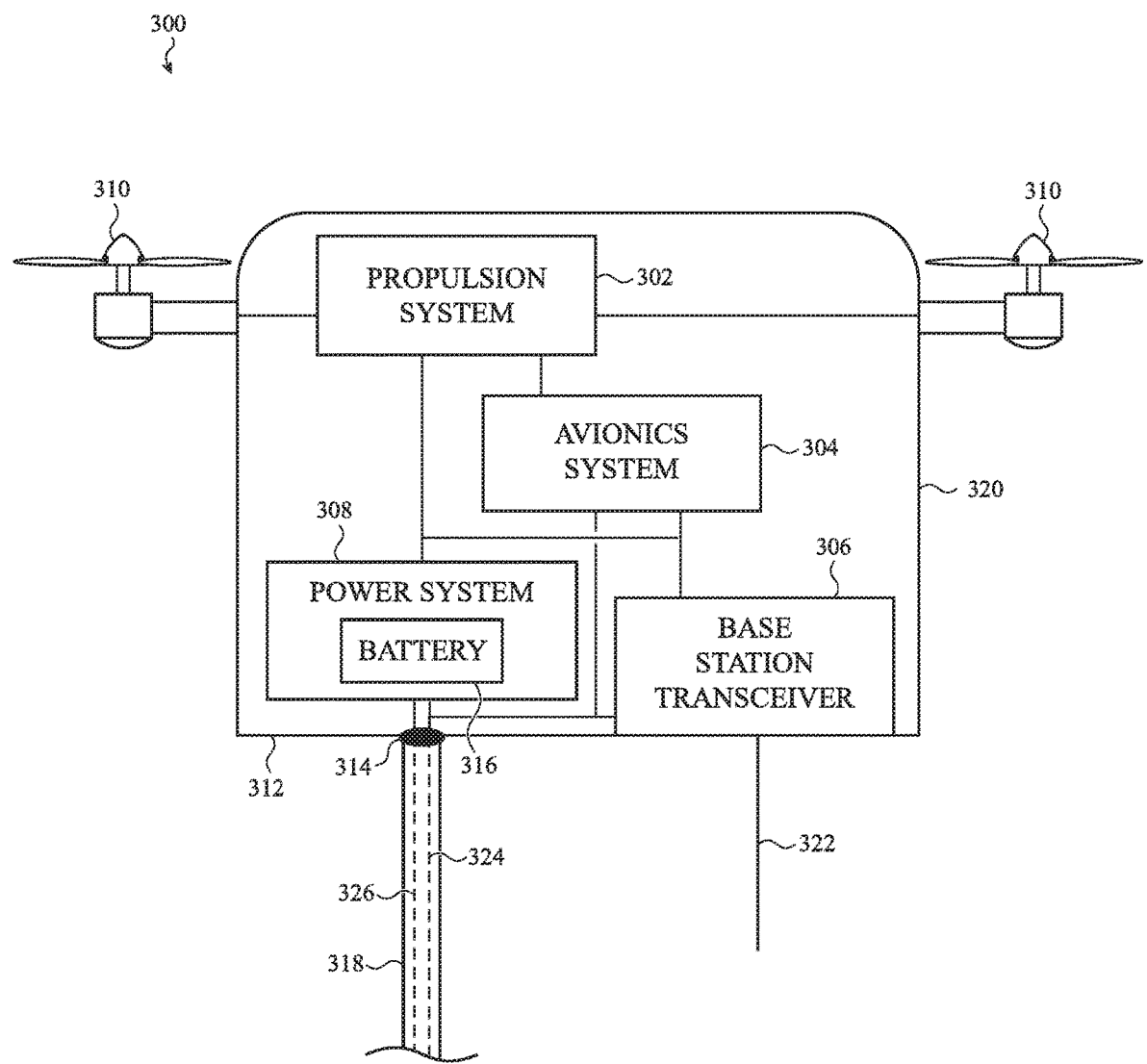
FIG. 3 shows an example block diagram of a drone.

FIG. 3 shows an example block diagram of a drone 300. The drone 300 is an example of the drone described with reference to FIG. 2. The drone 300 may include a propulsion system 302, an avionics system 304, a base station transceiver 306, and a power system 308. The propulsion system 302, avionics system 304, base station transceiver 306, and power system 308 may be mounted to a housing 320 (e.g., a drone housing), and each component or system may be positioned internal to the housing 320, external to the housing 320, or such that the component or system extends through the housing 320 and is partially positioned within the housing 320 and partially positioned external to the housing 320.

The propulsion system 302 may include a set of one or more propellers 310. Each propeller 310 may be configured to rotate substantially horizontally to a base 312 of the drone 300. The propeller(s) 310 may rotate around one or more axes, which axes may typically be oriented perpendicular to the base 312. The base 312 may be a plane defined by a set of feet or a bottom of the drone 300. For purposes of this description, propellers 310 that rotate substantially horizontally to the base 312 begin rotation in a plane horizontal to the base 312 upon power up, and end rotation in the plane upon power down. Propellers 310 that rotate substantially horizontal to the base 312 also rotate horizontal to the base 312 when the drone 300 is ascending or descending vertically under ideal conditions (e.g., no wind currents), and when the drone 300 is maintaining a steady-state in-air position under ideal conditions. In some cases, the axis or axes around which the propellers 310 rotate may be fixed, such that the propeller(s) 310 always rotate horizontal to the base 312. In other cases, the axis or axes around which the propellers 310 rotate may tilt, in the same or different directions. In these latter cases, the axis or axes may be tilted to steer the drone 300. When the axis or axes do not tilt, the drone 300 may be steered by changing the speed of rotation of different propellers 310, by adjusting the orientation of one or more rudders, and so on.

In some embodiments, the propulsion system 302 may include multiple propellers 310, with different propellers 310 rotating around different axes oriented at oblique angles with respect to the base 312.

The avionics system 304 may include a processor that controls the propulsion system 302 and/or power system 308. The avionics system 304 may include a navigation system, a signaling system (e.g., a system that activates one or more lights or audible alarms to alert persons or other devices to the presence or status of the drone 300), a camera, and so on.

The base station transceiver 306 may include one or more radios connected to one or more antennas 322 (e.g., one or more omnidirectional whip antennas, or one or more sector antennas providing cellular coverage for one or more sectors covering part or all of a 360 degree panoramic field of view). The base station transceiver 306 may communicate with user equipment (e.g., mobile phones and/or other devices) using the radio(s) and antenna(s) 322. The base station transceiver 306 may also include a physical interface (e.g., a wired, fiber, or optical interface) for connecting to a communication network (e.g., a backhaul network). The physical interface may connect to one or more wire, fiber, or fiber optic communication channels 324 included in a tether 318 connected to a tether connector 314, and ultimately to equipment (e.g., a base communication system) that is temporarily or semi-permanently located at a ground-based site (e.g., at the MBSE described with reference to FIG. 2). Also or alternatively, the base station transceiver 306 may include a wireless interface for connecting to a communication network (e.g., the backhaul network) wirelessly. The wireless interface may include, for example, an RF interface for connecting to equipment at a ground-based site (e.g., MBSE), on a satellite, or elsewhere. The base station transceiver 306 may be configured to transmit data between UEs and a communication network (in some cases, by transmitting or receiving signals or data through the tether 318).

The power system 308 may include a battery 316. The power system 308 may be configured to power the propulsion system 302, the avionics system 304, and the base station transceiver 306. The power system 308 may receive electrical power through the tether 318 (e.g., over one or more power feeds 326 (e.g., six redundant power feeds) included in the tether 318). The power system 308 may be configured to charge the battery 316 while the drone 300 is connected to the tether 318, while the drone 300 is or is not in the air, and while the base station transceiver 306 is or is not providing cellular service (or other wireless service) for UEs.

The avionics system 304 may be configured to operate the propulsion system 302, and to fly the drone 300, while the tether 318 is connected to the tether connector 314. Power may or may not be received by the power system 308, through the tether 318, while the avionics system 304 operates the propulsion system 302 to fly the drone 300.

The tether connector 314 may be a single physical connector, or may include a set of multiple connectors. In some cases, the tether connector 314 may consist of connectors for the power feeds 326 and communication channels 324. In other cases, the tether connector 314 may include connectors for the power feeds 326 and communication channels 324, in addition to a connector for a mechanical anchor (e.g., a braided steel cable) included within the tether 318. The tether connector 314, or components thereof, may be located on the drone's housing 320 as shown. Additionally or alternatively, the tether connector 314 or some of its components may be located internal to the housing 320, and in some cases may include an electrical connector of the power system 308 and/or a data connector of the avionics system 304 or base station transceiver 306.

For purposes of this description, the base station transceiver 306, or in some cases the base station transceiver 306 in combination with its antennas 322 and parts of the power system 308, or in some cases the drone 300 and all of its components and systems, may sometimes be referred to herein as a communication system.

Figure 4:
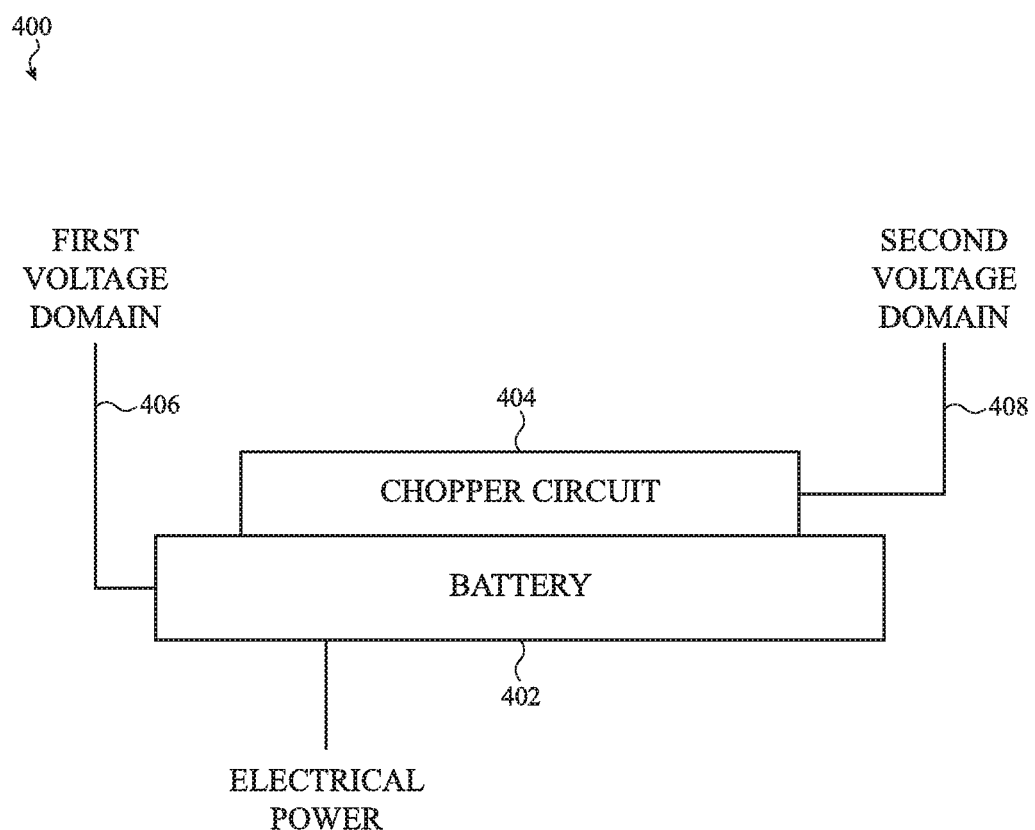
FIG. 4 shows an example block diagram of a power system.

FIG. 4 shows an example block diagram of a power system 400. The power system 400 is an example of the power system described with reference to FIG. 3. The power system 400 may include a battery 402 and a chopper circuit 404. The chopper circuit 404 may bleed excess charge from the battery 402.

The power system 400 may be configured to receive electrical power through a tether, and the electrical power may be used to charge the battery 402 as described with reference to FIG. 3. In some cases, the battery 402 may be overcharged. An overcharge may be a charge beyond the battery's full charge, or a charge above a threshold charge (e.g., a charge above 80% or 90% of the battery's full charge). Such an overcharge may be undesirable, and in some cases may stress or damage the battery 402. The chopper circuit 404 may therefore bleed off charge that exceeds the threshold charge. As described below, the excess charge may be used to provide power to various components or systems of a drone. The excess charge may also be converted to thermal energy (heat) and released via a heat sink or other heat dissipation element (or via a cooling system). However, using the excess charge to provide power to other components or systems can increase a drone's power efficiency and reduce the drone's cost of operation.

The battery 402 may be configured to provide power in a first voltage domain 406, and the chopper circuit 404 may be configured to provide power in a second voltage domain 408. In some embodiments, the battery 402 may be configured to provide power to a drone's propulsion system (in the first voltage domain 406), and the chopper circuit 404 may be configured to provide power to the drone's avionics system and/or base station transceiver (in the second voltage domain 408). In other words, the propulsion system may be powered by the battery 402, and the avionics system and/or base station transceiver may be powered by the battery 402 and through the chopper circuit 404. In some examples, the propulsion system, avionics system, and base station transceiver may be the propulsion system, avionics system, and base station transceiver described with reference to FIG. 3.

In some embodiments, the chopper circuit 404 may be configured to power a base station transceiver while the power system 400 is or is not receiving power through one or more power feeds in a tether.

Figure 5:
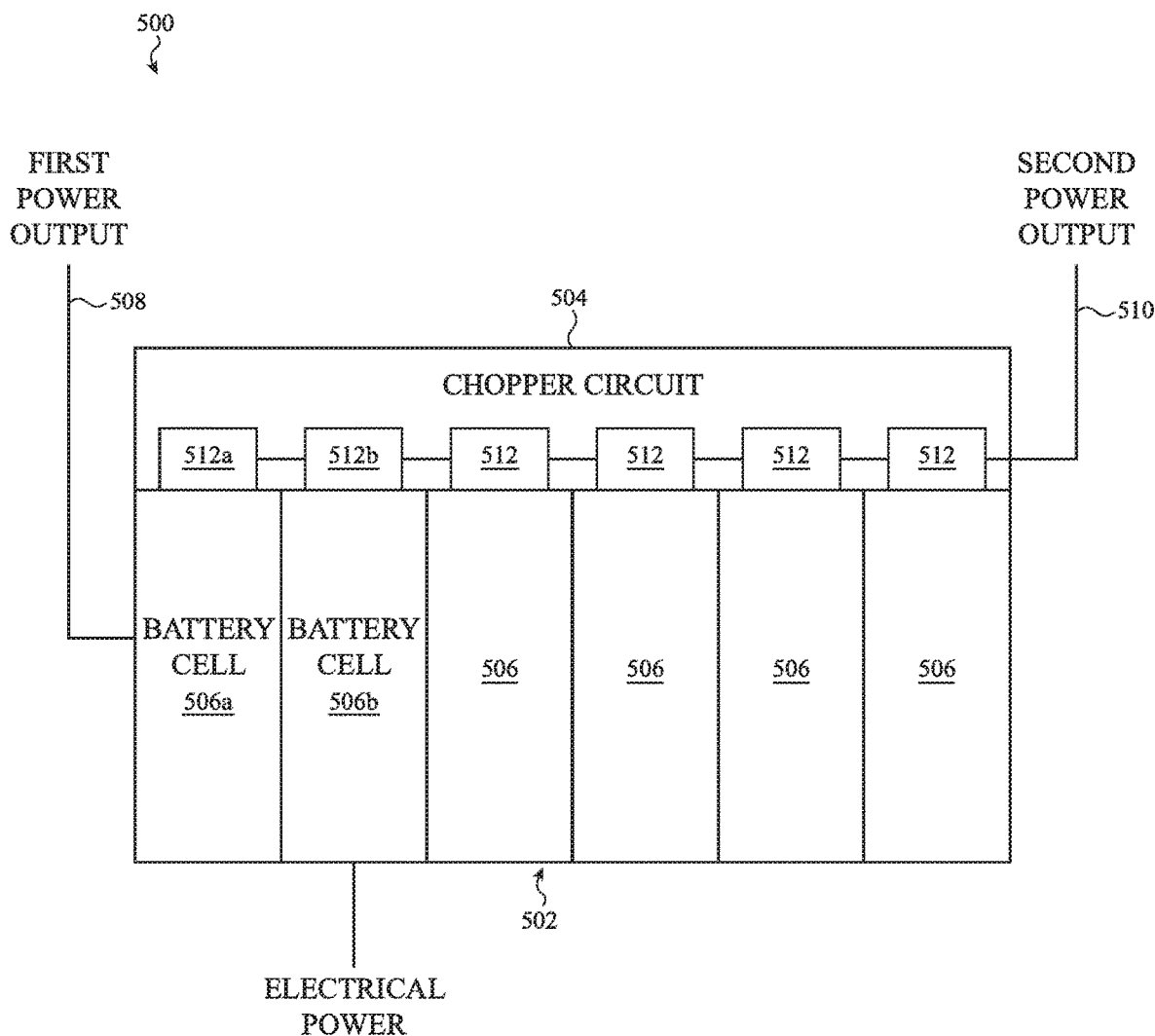
FIG. 5 shows another example block diagram of a power system.

FIG. 5 shows an example block diagram of a power system 500. The power system 500 is an example of the power systems described with reference to FIGS. 3 and 4. The power system 500 may include a battery 502 and a chopper circuit 504. The chopper circuit 504 may bleed excess charge from the battery 502, as described with reference to FIG. 4. In some embodiments, the battery 502 and chopper circuit 504 may be configured similarly to their respective components in the power system 400.

As shown, the battery 502 may have multiple battery cells 506. The battery cells 506 may be connected in parallel (e.g., as parallel-connected battery cells 506) to provide redundant power at a first power output 508. In some cases, the battery cells 506 may include five or six battery cells.

The chopper circuit 504 may bleed excess charge from the battery 502 and provide a second power output 510. The chopper circuit 504 may also balance charge between the battery cells 506, and may therefore be referred to as (or include) a charge-balancing circuit. In some embodiments, the chopper circuit 504 may be coupled to each of the battery cells 506.

In some embodiments, the chopper circuit 504 may include a set of multiple chopper circuits 512, with each chopper circuit 512 in the set of multiple chopper circuits 512 being coupled to a respective one of the battery cells 506. For example, a first chopper circuit 512a may be connected to a first battery cell 506a, a second chopper circuit 512b may be connected to a second battery cell 506b, and so on.

Each chopper circuit 512 in the set of multiple chopper circuits 512 may be connected in parallel with a respective battery cell 506, but connected in series with the other chopper circuits 512. For example, the first chopper circuit 512a may be connected in series with the second chopper circuit 512b, and in series with each other chopper circuit 512 in the set of multiple chopper circuits 512. An output of the series-connected chopper circuits 512 may provide the second power output 510.

The first power output 508 may provide power in a first voltage domain (e.g., 12 volts), while the second power output 510 may provide power in a second voltage domain (e.g., 48 volts). In this manner, the first and second power outputs 508, 510 may be used to power equipment requiring different voltage inputs. In some cases, a propulsion system may be configured to receive power from the first voltage domain; and an avionics system or base station transceiver may be configured to receive power from the second voltage domain. The propulsion system, avionics system, and base station transceiver may be the propulsion system, avionics system, and base station transceiver described with reference to FIG. 3.

Figure 6:
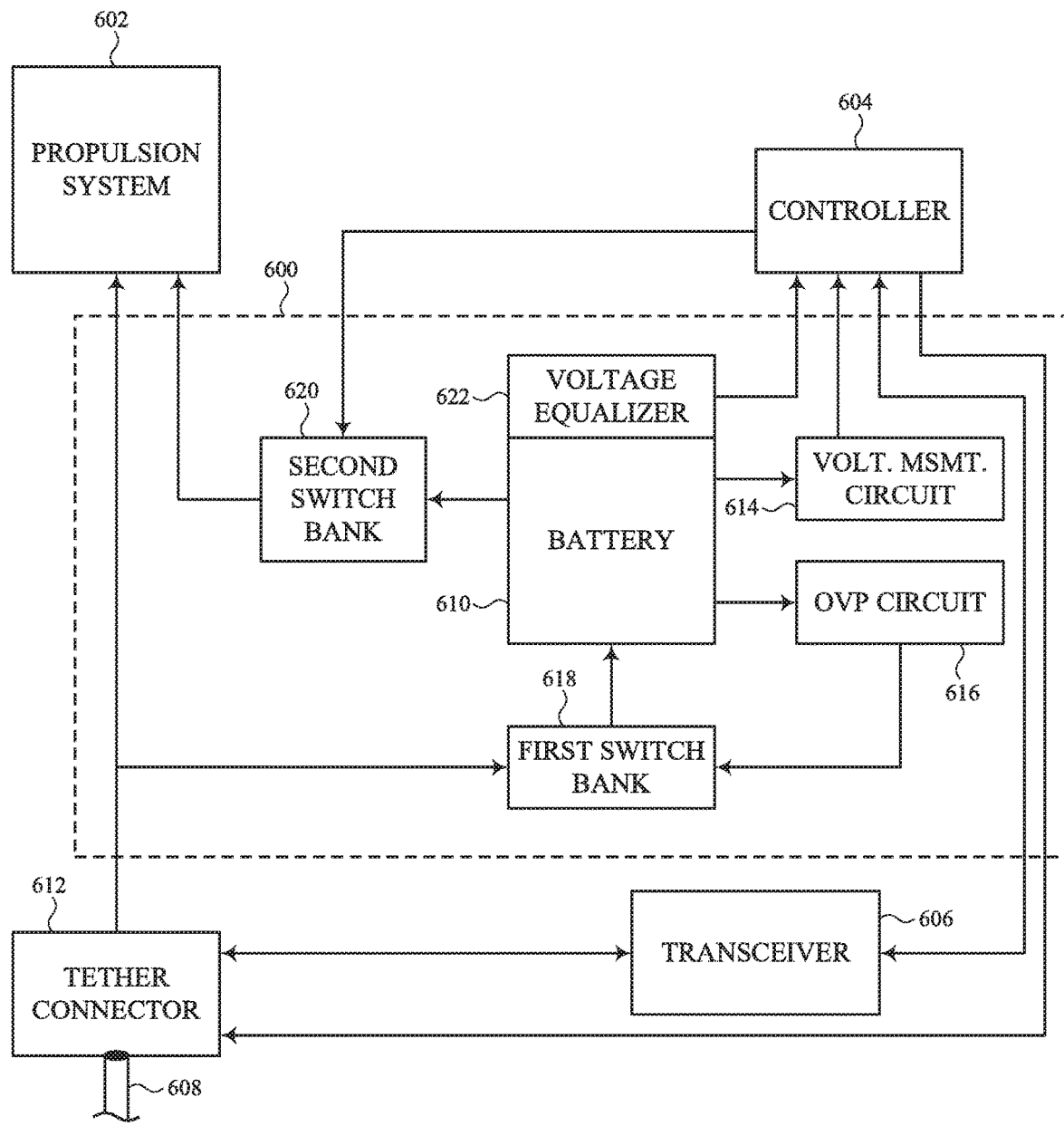
FIG. 6 shows an example block diagram of a power system, in combination with a propulsion system, a controller, and a transceiver.

FIG. 6 shows an example block diagram of a power system 600, in combination with a propulsion system 602, a controller 604, and a transceiver 606. The power system 600 is an example of the power system described with reference to FIG. 3, and in some cases may employ aspects of the power system described with reference to FIG. 4 or 5. The propulsion system 602 is an example of the propulsion system described with reference to FIG. 3. The controller 604 may be part of the avionics system or power system described with reference to FIG. 3. The transceiver 606 may be part of the avionics system or base station transceiver described with reference to FIG. 3.

The power system 600 may be configured to receive electrical power through a tether 608, and the electrical power may be used to charge a battery 610 (or multiple batteries) of the power system 600, as described with reference to FIG. 3. The electrical power received through the tether 608 may be provided to the battery 610 via a tether connector 612. The tether connector 612 may include, for example, a switch that mechanically connects the tether 608 to a drone that carries the power system 600, propulsion system 602, controller 604, and transceiver 606. In some cases, this switch may be a magnetic switch, although the switch may also be an electro-mechanical switch. The switch may default to a tether-connected state in the absence of power, and transition to a tether-disconnect state in response to the pulsing of a control signal (e.g., an electrical control signal provided by the controller 604, a voltage measurement circuit 614, or an overvoltage protection (OVP) circuit 616).

The tether connector 612 may also include connectors for connecting copper or other power lines, coaxial or other data cables, and so on to the power system 600, propulsion system 602, and/or transceiver 606. In some cases, the tether connector 612 may also include switches (e.g., electrical or optical switches) for switchably connecting tether power to the power system 600 or propulsion system 602, and/or for switchably enabling or disabling a drone-to-ground data connection. In this manner, tether power and/or data connections may be enabled or disabled separately from a mechanical release of the tether. In some embodiments, the tether 608 may be mechanically connected to a drone during take-off, but the switches of the tether connector 612 that complete drone-to-ground power and data connections may be open (or alternatively, closed). When the drone reaches an intended elevation, one or more tether connector switches may be closed to provide tether power to the battery 610, and/or to provide a data connection between the transceiver 606 and ground. When the battery 610 reaches a predetermined level of charge, tether connector power and data switches may be opened, and the drone may switch to full battery operation, before the switch that mechanically connects the tether 608 to a drone is pulsed and the tether 608 is mechanically released from the drone.

In some cases, the tether connector 612 may include a set of switches for connecting multiple redundant power lines to the power system 600 or propulsion system 602. Similarly, the tether connector 612 may include a set of switches for connecting multiple redundant or non-redundant data lines to the transceiver 606.

A first switch bank 618 may connect the power lines of the tether 608, as received through the tether connector 612, to the battery 610. In some embodiments, the first switch bank 618 may connect different power lines to different respective battery cells of the battery 610. In other embodiments, the first switch bank 618 may connect the power lines of the tether 608 to battery circuitry that determines how to filter, condition, or distribute received power to the battery cells.

In some embodiments, an OVP circuit 616 may monitor the charge on the battery 610. Before the charge on the battery 610 reaches a predetermined maximum (i.e., a maximum charge threshold), the OVP circuit 616 may close the switches of the first switch bank 618, enabling the battery 610 to receive tether power. When the charge on the battery 610 reaches the predetermined maximum, the OVP circuit 616 may open the switches of the first switch bank 618, preventing the battery 610 from receiving tether power. Alternatively, the OVP circuit 616 may separately monitor the charge on each battery cell of the battery 610, or on different groups of battery cells, and open and close switches of the first switch bank 618 to separately enable different battery cells to receive tether power.

In some embodiments, the OVP circuit 616 may enable/disable tether power using different thresholds, to prevent the switches of the first switch bank 618 from ping-ponging between open and closed states. For example, the OVP circuit 616 may open a switch, to disable the battery or a battery cell from receiving tether power when the charge on the battery or battery cell is determined to exceed a first threshold. Thereafter, the OVP circuit 616 may not close the switch, to enable the battery or battery cell to receive tether power until the charge on the battery or battery cell drops below a second threshold lower than the first threshold.

A second switch bank 620 may connect the battery 610 as a whole, or individual ones of its battery cells, to the propulsion system 602. The second switch bank 620 may be controlled by the controller 604, which in some cases may take the form of a discrete or distributed processor, a microprocessor, a microcontroller, a CPU, a PIC, an ASIC, an FPGA, or another form of controller. In some embodiments, the controller 604 may transmit a control signal to the tether connector 612 prior to takeoff, which control signal causes the tether connector 612 to open switches that provide tether power to the drone. The controller 604 may also transmit a control signal (or signals) to the second switch bank 620, which control signal(s) cause the second switch bank 620 to close its switches and provide battery power to the propulsion system 602. When the drone has reached an intended elevation, the controller 604 may transmit another control signal to the tether connector 612, which control signal causes the tether connector 612 to close switches that provide tether power to the drone. The controller 604 may also transmit a control signal (or signals) to the second switch bank 620, which control signal(s) cause the second switch bank 620 to open its switches, such that the propulsion system 602 operates on tether power while the battery 610 is recharged. The battery 610 may be recharged, as previously described, by the OVP circuit's operation of the first switch bank 618.

The controller 604 may receive voltage measurements from a voltage measurement circuit 614 that, for example, measures a charge on the battery 610 or determines when all of the battery's cells have been sufficiently charged. Additionally or alternatively, the controller 604 may receive voltage measurements, or battery or battery cell health information, from a voltage equalizer 622. The controller 604 may also receive information or instructions from a ground-based power delivery system or ground-based communication equipment. In response to one or more of its inputs, the controller 604 may determine if and when to disconnect the tether 608 from the drone. In some cases, the controller 604 may only disconnect the tether 608 in the case of an emergency that necessitates such a disconnection. In some cases, the controller 604 may disconnect the tether 608 only before landing, and after closing the switches of the second switch bank 620 to power the propulsion system 602 using battery power. In some cases, the controller 604 may determine that the battery 610 or its battery cells have reached a predetermined charge threshold (e.g., fully charged, 80% charged, or charged enough for the drone to execute a mission of predetermined length or duration); close the switches of the second switch bank 620 to power the propulsion system 602 using battery power; and then transmit a control signal that causes the tether connector 612 to disconnect the tether 608 from the drone.

The voltage equalizer 622 may include (or be configured similarly to) the charge-balancing circuit or chopper circuit(s) described with reference to FIG. 4 or 5.

The controller 604 may communicate with a ground-based power system, ground-based communication equipment, or other ground-based, hand-held, suspended, or floating systems via the transceiver 606, or via one or more of multiple transceivers. In some embodiments, the transceiver 606 may be physically connected to one or more data lines in the tether 608 via connections within the tether connector 612. Alternatively, the transceiver 606 may wirelessly connect to a ground-based power system, ground-based communication equipment, or other ground-based, hand-held, suspended, or floating system. The wireless connection may be negotiated using any one or more of a number of RATs, including, for example, Bluetooth, Wi-Fi, GSM, UMTS, LTE, or 5G NR RATs. In some embodiments, the controller 604 may transmit information it receives from the voltage measurement circuit 614 or voltage equalizer 622 via the transceiver 606 (and in some cases via the tether 608).

In some embodiments, the controller 604 may receive the thresholds that it uses to make various decisions via the transceiver 606. In some cases, the controller 604 may receive thresholds that it uses to program the voltage measurement circuit 614 or OVP circuit 616.

In some embodiments, the battery 610 or voltage equalizer 622 may provide power to the controller 604, the transceiver 606, a base station transceiver, or components of an avionics system, as described, for example, with reference to FIGS. 3-5.

Figure 7:
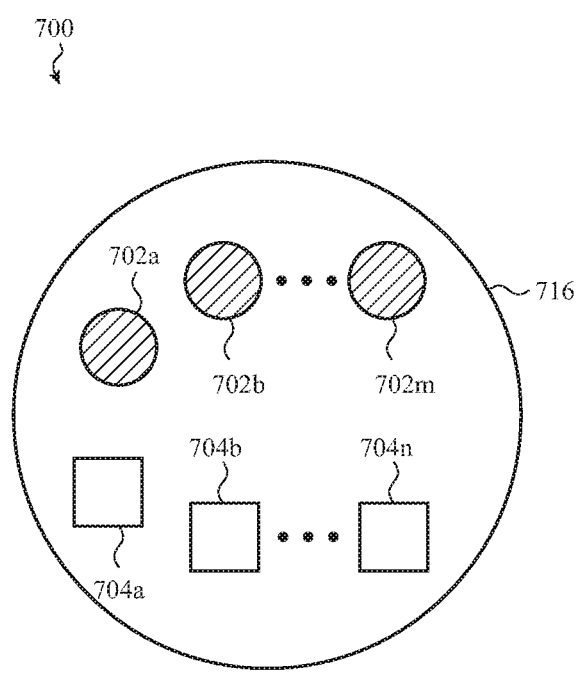
FIG. 7 shows an example cross-section of a hybrid cable.

FIG. 7 shows an example cross-section of a hybrid cable 700. The hybrid cable 700 may be an example of the tether described with reference to FIG. 2, 3, or 4. The cross-section may be taken along the cut line A-A' of FIG. 2. The hybrid cable 700 may include an outer sheath 716 and one or more sets of transmission components including power feeds 702 and communication channels 704. The power feeds and communication channels may link components of a drone (e.g., the drone described with reference to FIG. 2 or 3) to components of a power delivery system (e.g., the MBSE and power source described with reference to FIG. 2). The hybrid cable 700 may also contain inert material (e.g., insulation) that provides electrical and physical spacing between the various power feeds 702 and communication channels 704.

A first set of transmission components included in the hybrid cable 700 may be a set of power feeds 702a, 702b, . . . 702m (e.g., a set of electrical power supply lines). There may be one or more such power feeds 702a, 702b, . . . 702m. The power feeds 702a, 702b, . . . 702m may provide redundant electrical power to a drone, and particularly to its battery. In some embodiments, the power feeds 702a, 702b, . . . 702m may include copper lines, coaxial cables, and so on.

A second set of transmission components included in the hybrid cable 700 may be a set of communication channels 704a, 704b, . . . 704n. The communication channels 704a, 704b, . . . 704n may connect to a drone communication system (e.g., the drone communication system described with reference to FIG. 2, or the base station transceiver described with reference to FIG. 2 or 3). The communication channels 704a, 704b, . . . 704n may include fiber optic cables, twisted pair lines, coaxial cables, or other structures that may provide communication links between a drone communication system and a ground-based communication system (e.g., the base communication system of the MBSE described with reference to FIG. 2).

Figure 8:
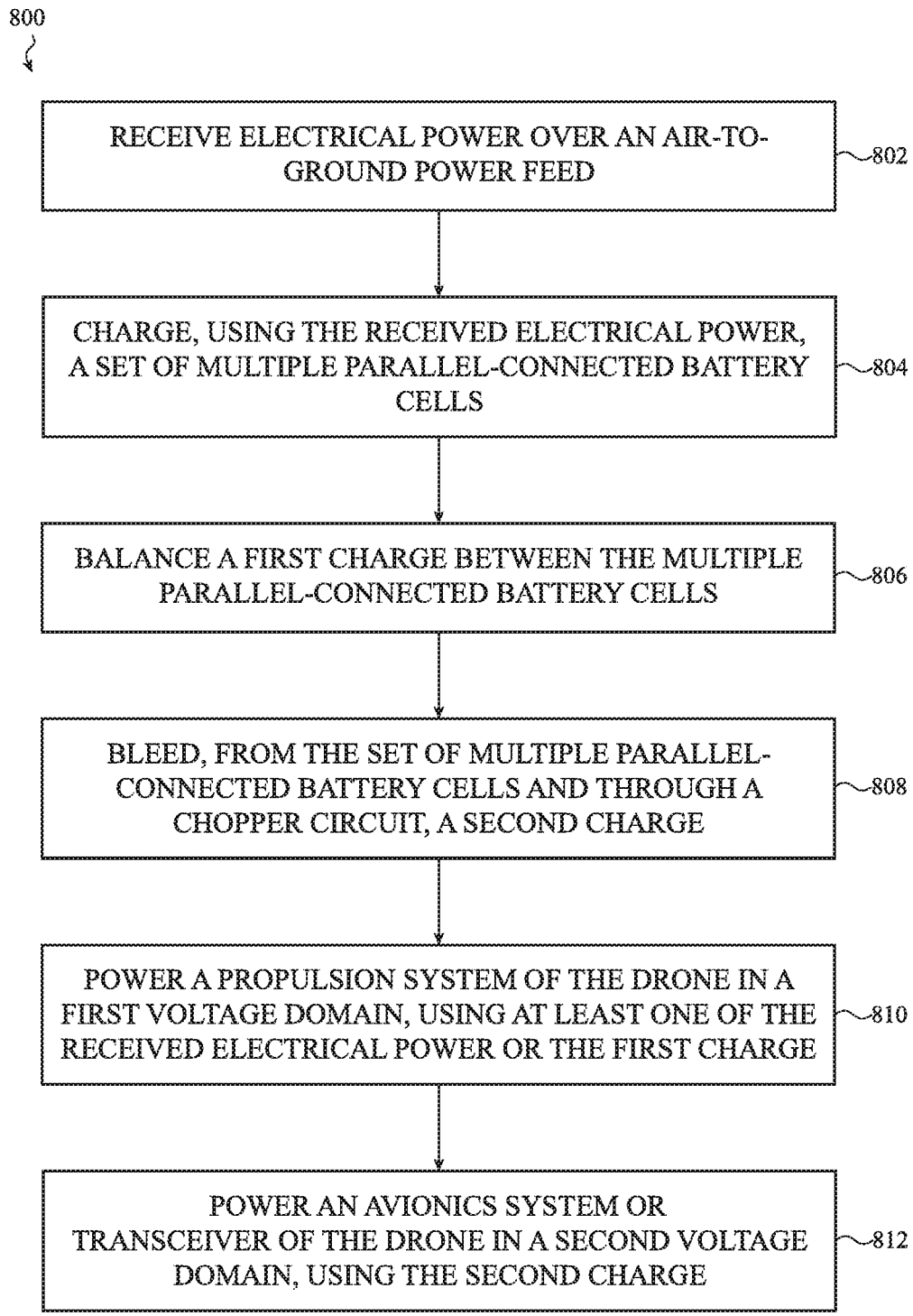
FIG. 8 shows an example method of powering a drone.

FIG. 8 shows an example method 800 of powering a drone that carries a transceiver.

At block 802, the method 800 includes receiving electrical power over an air-to-ground power feed. In some embodiments, the electrical power may also be received over additional air-to-ground power feeds. For example, the electrical power may be received, in parallel, over a set of redundant air-to-ground power feeds (e.g., six air-to-ground power feeds). In further embodiments, the electrical power may be received over a power feed that is not necessarily an air-to-ground power feed. In some embodiments, the air-to-ground power feeds may be power feeds in the tether described with reference to FIG. 2, 3, or 4.

At block 804, the method 800 may include charging, using the received electrical power, a set of multiple parallel-connected battery cells. In some embodiments, the battery cells may be the battery cells described with reference to FIG. 5.

At block 806, the method 800 may include balancing a first charge between the multiple parallel-connected battery cells (or equivalently, balancing the first charge on the set of multiple parallel-connected battery cells). In some embodiments, the balancing of the first charge may be performed using a set of series-connected chopper circuits, in which each chopper circuit in the set is coupled to a respective battery cell of the set of multiple parallel-connected battery cells. In some embodiments, the set of series-connected chopper circuits may be the set of series-connected chopper circuits described with reference to FIG. 5.

At block 808, the method 800 may include bleeding, from the set of multiple parallel-connected battery cells and through a chopper circuit, a second charge. In some embodiments, the chopper circuit may be the chopper circuit described with reference to FIG. 4, 5, or 6. In some embodiments, the chopper circuit may include the set of series-connected chopper circuits described in the preceding paragraph.

At block 810, the method 800 may include powering a propulsion system of the drone in a first voltage domain, using at least one of the received electrical power or the first charge.

At block 812, the method 800 may include powering an avionics system or transceiver (e.g., a base station transceiver, Wi-Fi transceiver, or wired transceiver (e.g., a USB transceiver)) of the drone in a second voltage domain, using the second charge.

All of the operations described with reference to blocks 802-812 may be performed while the drone is in the air. The operations may also be performed while the drone is in the air and attached to the tether.

Although shown in a sequential line, the operations performed at blocks 802-812 may all be performed in parallel. In some cases, and at a first time (or first set of times), the propulsion system may be powered in the first voltage domain and the transceiver may be powered in the second voltage domain, while the drone is in the air and receiving electrical power over the air-to-ground power feed. In some cases, and at a second time (or second set of times), the propulsion system is powered in the first voltage domain and the transceiver is powered in the second voltage domain, while the drone is in the air and not receiving electrical power over the air-to-ground power feed. In some cases, the first time may be during a take-off of the drone, while the drone is attached to the air-to-ground power feed, and the second time may be after the air-to-ground power feed is detached from the drone. In these cases, the charging performed at block 804 may be performed at a third time, between the first time and the second time.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A drone, comprising:
a propulsion system;
a base station transceiver;
a tether connector; and
a power system having:
a battery; and
a chopper circuit that bleeds excess charge from the battery; wherein:
the power system is configured to:
power the propulsion system;
power the base station transceiver through the chopper circuit; and
receive electrical power, through a tether connected to the tether connector, while the drone is in the air.

2. The drone of claim 1, wherein:
the battery is configured to provide power to the propulsion system in a first voltage domain; and
the chopper circuit is configured to provide power to the base station transceiver in a second voltage domain.

3. The drone of claim 1, wherein:
the battery comprises multiple parallel-connected battery cells;
the chopper circuit comprises a set of multiple chopper circuits;
the set of multiple chopper circuits comprises a first chopper circuit connected to a first battery cell of the multiple parallel-connected battery cells, and a second chopper circuit connected to a second battery cell of the multiple parallel-connected battery cells; and
chopper circuits in the set of multiple chopper circuits, including the first chopper circuit and the second chopper circuit, are connected in series.

4. The drone of claim 3, wherein:
the battery comprises multiple parallel-connected battery cells; and
the set of multiple chopper circuits balances charge between the multiple parallel-connected battery cells.

5. The drone of claim 1, wherein:
the power system is configured to receive the electrical power through the tether, while the drone is in the air, and while the base station transceiver is providing cellular service for user equipment.

6. The drone of claim 1, wherein:
the chopper circuit is configured to power the base station transceiver while the power system is receiving the electrical power through the tether.

7. The drone of claim 1, wherein:
the chopper circuit is configured to power the base station transceiver while the drone is not receiving the electrical power through the tether.

8. The drone of claim 1, wherein the power system is configured to receive the electrical power, through the tether, over a set of redundant power feeds.

9. A communication system, comprising:
a transceiver;
a battery having multiple parallel-connected battery cells; and
a charge-balancing circuit coupled to each of the multiple parallel-connected battery cells; wherein:
the battery is configured to provide a first power output in a first voltage domain;
the charge-balancing circuit is configured to provide a second power output in a second voltage domain; and
the transceiver is configured to receive electrical power from the second voltage domain.

10. The communication system of claim 9, wherein:
the charge-balancing circuit comprises a set of multiple chopper circuits;
the set of multiple chopper circuits comprises a first chopper circuit connected to a first battery cell of the multiple parallel-connected battery cells, and a second chopper circuit connected to a second battery cell of the multiple parallel-connected battery cells; and chopper circuits in the set of multiple chopper circuits, including the first chopper circuit and the second chopper circuit, are connected in series.

11. The communication system of claim 9, further comprising:
receiving electrical power over a set of redundant power feeds; and
charging the battery using the received electrical power, while providing the first power output and the second power output.

12. The communication system of claim 9, further comprising:
a propulsion system; and
a housing to which the transceiver, the battery, and the propulsion system are mounted; wherein:
the propulsion system is configured to receive the electrical power from the second voltage domain.

13. The communication system of claim 12, further comprising:
a first switch bank configured to connect or disconnect the battery to one or more power lines in a tether; and
a second switch bank configured to connect or disconnect the propulsion system to the second voltage domain or to the one or more power lines in the tether.

14. A method of powering a drone carrying a transceiver, comprising:
receiving electrical power over an air-to-ground power feed;
charging, using the received electrical power, a set of multiple parallel-connected battery cells;
balancing a first charge across the set of multiple parallel-connected battery cells;
bleeding, from the set of multiple parallel-connected battery cells and through a chopper circuit, a second charge;
powering a propulsion system of the drone in a first voltage domain using at least one of the received electrical power or the first charge; and
powering the transceiver in a second voltage domain using the second charge.

15. The method of claim 14, wherein the air-to-ground power feed comprises a first air-to-ground power feed, and the method further comprises:
receiving the electrical power in parallel over a set of redundant air-to-ground power feeds including the first air-to-ground power feed.

16. The method of claim 14, wherein the balancing of the first charge is performed using a set of series-connected chopper circuits, in which each chopper circuit in the set of series-connected chopper circuits is coupled to a respective battery cell of the set of multiple parallel-connected battery cells.

17. The method of claim 16, wherein the charging, the balancing, the bleeding, the powering of the propulsion system, and the powering of the transceiver are performed while the drone is in the air.

18. The method of claim 15, wherein, at a first time, the propulsion system is powered in the first voltage domain and the transceiver is powered in the second voltage domain, while the drone is in the air and receiving the electrical power over the air-to-ground power feed.

19. The method of claim 18, wherein, at a second time, the propulsion system is powered in the first voltage domain and the transceiver is powered in the second voltage domain, while the drone is in the air and not receiving the electrical power over the air-to-ground power feed.

20. The method of claim 19, wherein:
the first time is during a take-off of the drone, while the drone is attached to the air-to-ground power feed;
the second time is after the air-to-ground power feed is detached from the drone; and
the charging is performed at a third time, between the first time and the second time.

* * * * *